United States Patent
Lettkeman et al.

(10) Patent No.: US 7,754,007 B2
(45) Date of Patent: Jul. 13, 2010

(54) GYPSUM MIXTURES FOR FORMING SOLIDS

(75) Inventors: Dennis Lettkeman, Watonga, OK (US); John W. Wilson, Fairview, OK (US); Raymond A. Kaligian, II, Geneva, IL (US); Brian K. Ball, Fort Dodge, IA (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 12/253,727

(22) Filed: Oct. 17, 2008

(65) Prior Publication Data

US 2009/0101045 A1    Apr. 23, 2009

Related U.S. Application Data

(60) Provisional application No. 61/000,076, filed on Oct. 23, 2007.

(51) Int. Cl.
*C04B 28/14* (2006.01)
(52) U.S. Cl. ....................................... 106/779; 106/785
(58) Field of Classification Search ................. 106/779, 106/785
See application file for complete search history.

(56) References Cited

U.S. PATENT DOCUMENTS

| | | | |
|---|---|---|---|
| 2,078,198 A | 4/1937 | King | |
| 3,573,947 A | 4/1971 | Kinkade et al. | |
| 4,455,171 A * | 6/1984 | Spensley et al. | ............ 106/694 |
| 4,954,440 A | 9/1990 | Johal et al. | |
| 5,175,278 A | 12/1992 | Peik et al. | |
| 5,424,099 A * | 6/1995 | Stewart et al. | ........... 427/397.7 |
| 5,439,518 A * | 8/1995 | Francis et al. | ............... 106/705 |
| 5,879,446 A * | 3/1999 | Patel et al. | .................. 106/781 |
| 6,110,271 A | 8/2000 | Skaggs et al. | |
| 6,409,823 B1 | 6/2002 | Shake et al. | |
| 7,056,964 B2 | 6/2006 | Lettkeman et al. | |
| 2005/0235882 A1 * | 10/2005 | Lettkeman et al. | .......... 106/778 |

OTHER PUBLICATIONS

CP Kelco, "Kelco-Crete diutan gum," published on the internet at www.cpkelco.com/diutan/index.html, believed published circa 2005.

* cited by examiner

*Primary Examiner*—Elizabeth D Wood
(74) *Attorney, Agent, or Firm*—Greer, Burns & Crain, Ltd.; David F. Janci, Esq.; Pradip Sahu, Esq.

(57) ABSTRACT

An example embodiment of a mixture to be employed in conjunction with water for preparing a slurry that hydrates to form a high strength flooring compound comprises about 50% to about 98% by weight calcium sulfate hemihydrate, about 0.002% to about 1% by weight polysaccharide, and about 0.02% to about 2.5% by weight of a lignosulfanate.

20 Claims, No Drawings

GYPSUM MIXTURES FOR FORMING SOLIDS

CROSS REFERENCE TO RELATED APPLICATION

The present application claims priority under 35 U.S.C. §119 on U.S. provisional application Ser. No. 61/000,076 filed on Oct. 23, 2007.

BACKGROUND OF THE INVENTION

Embodiments of this invention relate to high strength flooring compositions. Some embodiments relate to a flooring composition made using gypsum and one or more water reducing agents.

Both gypsum and cement are well known as construction materials. Gypsum is the principal component of the familiar wallboard, where is it faced with paper to provide strength and a smooth surface. Cement is used in various applications where its water resistance and hardness are important, such as in concrete structures. Cement is also used in building panels where its hardness and water resistance are important.

Gypsum is also known as calcium sulfate dihydrate, terra alba or landplaster. Plaster of Paris is also known as calcined gypsum, stucco, calcium sulfate semihydrate, calcium sulfate half-hydrate or calcium sulfate hemihydrate. Synthetic gypsum, which is a byproduct of flue gas desulfurization processes from power plants, may also be used. When it is mined, raw gypsum is found in the dihydrate form. In this form, there are approximately two water molecules of water associated with each molecule of calcium sulfate. In order to produce the hemihydrate form, the gypsum can be calcined to drive off some of the water of hydration by the following equation:

$$CaSO_4 \cdot 2H_2O \rightarrow CaSO_4 \cdot \tfrac{1}{2}H_2O + 3/2H_2O$$

When mixed with water, the hemihydrate rehydrates to form an interlocking matrix of interlocking dihydrate crystals. Gypsum hydration occurs in a matter of minutes or hours compared to several days for cement. This makes gypsum an attractive alternative for cement for flooring applications if sufficient hardness and strength can be achieved in the gypsum.

Gypsum flooring compositions typically include a sand additive. The amount of sand added to a composition depends on a variety of factors. Generally, higher levels of sand are desirable for economic reasons since greater sand addition leads to increased slurry coverage per unit mass of gypsum. Higher sand compositions, however, also generally lead to lower final product strength.

So called "water reducing agents" are slurry additives useful to reduce the amount of water required per unit mass of gypsum and other materials. Examples of water reducing agents include plasticizers, dispersants, and viscosity modifiers. These agents can improve the fluidity and other properties of a gypsum slurry. Among other functions, they can disperse the molecules in solution so that they move more easily relative to each other and thereby improve the flowability of the entire slurry. So-called superplasticizers generally include sulfonated naphthalene formaldehyde or sulfonated melamine formaldehyde as well as new generation polycarboxylic ethers (PCE). Plasticizers generally function to prevent agglomeration through electrostatic repulsion. New technology PCE's, on the other hand, function to increase flow through steric stabilization.

BRIEF SUMMARY OF THE INVENTION

An example embodiment of a mixture, to be employed in conjunction with water for preparing a slurry that hydrates to form a high strength flooring compound comprises about 50% to about 98% by weight calcium sulfate hemihydrate, about 0.002% to about 1% by weight polysaccharide, and about 0.02% to about 2.5% by weight of a lignosulfanate.

DETAILED DESCRIPTION OF THE INVENTION

Before discussing example embodiments of the invention in detail, it will be appreciated that some embodiments of the present invention are directed to mixtures to be employed in conjunction with water for preparing a slurry that hydrates to form a high strength flooring compound. Other embodiments are directed to methods for preparing a subfloor, and still others are directed to subfloors. It will be additionally appreciated that in describing a particular embodiment of the invention description may be had of other related embodiments. For example, when describing a mixture of the invention one skilled in the art will understand that description to also apply to methods for preparing that mixture.

It will also be appreciated that in example embodiments described in detail below, all components of the composition are described in terms of dry ingredients in a dry mixture. It is contemplated that this is only one possible embodiment, and that liquid ingredients, when measured on a dry solids basis, are equivalent to the dry components. Unless otherwise stated, all components are measured in terms of weight on a dry solids basis, excluding any aggregate or fillers that may be present.

One example mixture for making a slurry suitable for use in flooring applications is made from about 50% to about 98% calcium sulfate hemihydrate, about 0.002% to about 1% by weight polysaccharide, and about 0.02% to about 2.5% by weight of a lignin. It has been discovered that the combination of the polysaccharide with the lignin, with one example being lignosulfanate, provides surprising and beneficial results related to increased strength, better flow, lowered bleed, increased sand concentration, and other physical properties of the resulting slurry. Importantly, this example embodiment achieved these benefits without the use of so-called superplasticizers. Cost savings are therefore attained.

The primary component of the dry mixture is calcium sulfate hemihydrate. The dry mixture composition can include from about 50% to about 98% hemihydrate by weight. Other possible calcium sulfate hemihydrate ranges include from about 80% to about 98%, from about 80% to about 95% or from 88% to about 95% of the dry mixture.

Any type of hemihydrate is useful in this mixture. It can be prepared by any known process, such as slurry processes, lump rock processes or atmospheric calcination methods. Either alpha calcined calcium sulfate hemihydrate or beta-calcined calcium sulfate hemihydrate are useful in the mixture. The alpha form of calcium sulfate hemihydrate crystals is less acicular in shape than the beta version. The less acicular shape allows the crystals to wet out and flow much better when mixed with water. The lower water demand of the alpha form results in a more closely packed, and higher density composite in comparison to the resultant interlocking matrix of calcium sulfate hemihydrate crystals utilizing the beta form of calcium sulfate hemihydrate. As is known in the art, the combination of alpha and/or beta calcium sulfate hemihydrate controls the amount of water needed to form a workable slurry, which controls the density of the final cast model.

Any alpha or beta-calcined hemihydrate is suitable for use in the present composition. Preferred alpha-hemihydrates include those made from a slurry process, such as HYDRO-CAL C-Base, J-Base or E-Base from United States Gypsum Company (Chicago, Ill.), by lump rock processes, such as HYDROCAL A-Base or B-Base, or any other method of making alpha-calcined hemihydrate. No. 1 Moulding plaster is a preferred beta-hemihydrate from United States Gypsum Co. (Chicago, Ill.). Continuously calcined synthetic gypsum is equivalent to beta-calcined hemihydrate. Beta-hemihydrate made from other methods is also useful. The addition of soluble calcium sulfate anhydrite is a suitable substitute for up to 50% of the hemihydrate, and will serve to provide strength to the matrix. Calcium sulfate dihydrate serves as a filler and should be used only in minor amounts, less than 25% by weight of the hemihydrate.

Whether beta-calcined gypsum, alpha-calcined gypsum or a combination of alpha and beta is selected for a particular application depends on a number of factors. For example, beta-calcined gypsum may be used to a large extent where cost is a primary concern. Beta-calcined gypsum also has higher workability and bleeds less than the alpha form. However, in some embodiments, where even higher strength is desirable, the alpha-hemihydrate or mixtures of the alpha and beta forms are preferred. Where mixtures of alpha and beta-calcined hemihydrate are used, the mixture should include at least 25% beta-hemihydrate. In some example embodiments, the amount of the beta-calcined form is greater than 50% or greater than 90% of the total hemihydrate.

A surprising and unanticipated result that occurred in some examples of this embodiment of the invention included high finished floor strength that resulted from mixtures that used only the lump rock processed alpha hemihydrate form of gypsum. Levels of strength were achieved that would typically be expected of mixtures that utilized the more costly slurry process alpha hemihydrate. While the exact chemical phenomenon behind this unexpected result is not known with certainty, it is believed to be related to synergistic interactions between the polysaccharides and the lignosulfanates.

The polysaccharide in combination with the lignosulfanate has further been discovered to unexpectedly improve the sand loading to allow for lower water demand, provide good lift to the slurry, reduce bleed and settling, improve pumpability and flow characteristics, and improve final product strength. These benefits have been achieved regardless of the particular calcium hemihydrate employed.

Results achieved cannot be duplicated through the use of equivalent (or greater) amounts of either component alone. Again, although the particular chemical mechanism that contributes to these unexpected results is not completely clear, it is believed that it relates to a synergistic combination of the two components.

Polysaccharides function to keep the components of the slurry in suspension until the crystal matrix forms sufficiently to assure uniform distribution. Sand or other aggregates are prevented from settling. The slurry is less viscous and easier to pump, thereby reducing energy costs. Workability of the composition and surface lubricity are also increased.

The polysaccharide can be provided in a weight range of between about 0.002% to about 1.0%. Other possible polysaccharide weight ranges include between about 0.01% and about 0.5%, and between about 0.02% and about 0.25%. Many different polysaccharides will be useful in different example mixtures. Some example polysaccharides that are particularly useful with the invention include biopolymeric gums and glucan products (such as scleroglucan, schizophyllan and the like). Scleroglucan is produced by filamentous fungi of the genera Sclerotium. Schizophyllan is an extracellular polysaccharide produced by fungi of the genera Schnizophyllum.

Scleroglucan and schizophyllan are polysaccharides whose linear chain of 1-3 linked D-glycosyl units with about 30 to about 35 percent of the linear chain containing single D-glycosyl units that are attached by 1-6 linkages. The average molecular weight is greater than or equal to $5 \times 10^6$. They are nonionic homopolysacchrides. The chains are self-associated in a triple helix arrangement. They dissolve in water to form pseudo plastic solutions. Additional characterization of these compounds and a method for making them is taught in U.S. Pat. No. 4,954,440, herein incorporated by reference. One commercially available example of a scleroglucan is marketed by SKW Polymers (Kennesaw, Ga.) under the trade name BIOVIS. Other polysaccharide gums, such as xanthan gums, welan gums and other gums are can also be used with this invention.

Other example polysaccharides include hetero-polysaccharides. These are high molecular weight, generally linear carbohydrate polymers containing two or more different kinds of monosaccharides. The two or more kinds of monosaccharides form a repeating unit that is polymerized, such as S-657, discussed in U.S. Pat. Nos. 5,175,278 and 6,110,271 herein incorporated by reference. This polysaccharide is an example of a xanthan gum that is particularly useful in this invention. S-657 forms an extended intertwined 3-fold left-handed double helix with a molecular weight estimated in excess of two million Daltons and is marketed under the trade name Diutan (or Diutan Gum) by Kelco Biopolymers (San Diego, Calif.).

This example embodiment of the invention further includes between about 0.02% and about 2.5% lignins or similar plasticizer. Other ranges include between about 0.025% and about 1.25%, and between about 0.025% and about 0.625%. One lignin believed to be of particular utility are lignosulfonates. Lignosulfonates, or sulfonated lignin, (CAS Number 8062-15-5) are water-soluble anionic polyelectrolyte polymers, byproducts from the production of wood pulp using sulfite pulping. They are useful to prevent agglomeration of other components in the mixture and thereby to increase flowability of the mixture. In the example embodiments of the invention, they have been further found to synergistically and unexpectedly interact with the polysaccharide to provide the unexpected benefits and advantages described above. One example lignin found to be useful in invention embodiments is the Marasperse C-21 product available from Reed Lignin, Greenwich, Conn.

Example formulations of the invention may include other components, with examples being defoaming agents, set retarders, accelerators, and the like. Various additives may be useful depending on particular applications, process conditions, and other considerations.

Many additional ingredients are suitable to optimize the dry mixture. Defoamers are used to reduce air bubbles formed during mixing of the dry mixture with the water. When used, the dry mixture includes up to 0.5% defoamer. FOAMASTER CN (Astro Chemicals, Kankakee, Ill.) is an example defoamer. Boric acid is optionally added to the dry mixture to reduce calcination and mold/mildew growth. Typically, it is added in amounts up to 1.25%. Other suitable ranges of boric acid addition are up to 1% and up to 0.5%.

Retarders are added to increase the working time of the slurry. Target working time varies, with one example range being from about 10 minutes to about 2 hours depending on the composition being used, where and how the slurry is being applied. Any retarders known to be useful with calcium sulfate hemihydrate are suitable in amounts to produce working times consistent with the target range. Proteinaceous retarders, such as SUMA, Cream of Tartar (potassium bitartrate), sodium citrate and diethylenetriamine pentaacetic acid are examples.

Set accelerators are used to hasten setting of the slurry. Any accelerators known to hasten setting of the hemihydrate may be used, including, but not limited to sulfates, acids and calcium sulfate dihydrate. Useful amounts vary with the efficacy of the accelerator selected, but are generally less than 1% by weight.

Calcium sulfate dihydrate that has been finely ground is one example accelerator. When freshly prepared, it has high potency and is suitable for immediate use in the slurry. However, when stored prior to use, it loses its effectiveness. U.S. Pat. No. 2,078,198, herein incorporated by reference, discloses improved accelerators comprising calcium sulfate dihydrate intermixed with a material such as sugar. This mixture renders the calcium sulfate dihydrate less subject to deterioration by aging and is useful in the slurry within several days (weeks). Heating the co-ground sugar and calcium sulfate dihydrate mixture so that caramelized sugar forms a coating on the calcium sulfate dihydrate is disclosed in U.S. Pat. No. 3,573,947, herein incorporated by reference. The melted sugar coating further stabilizes the calcium sulfate dihydrate, reducing the effects of aging to a greater degree than the unheated sugar/dihydrate mixture. Ground calcium sulfate dihydrate prepared in this manner is referenced in the examples as "CSA" (United States Gypsum Co., Chicago, Ill.). In any form, the ground dihydrate is often used in concentrations less than 0.5% by weight.

The compositions of this invention optionally have a number of further additives depending on the specific application. These additives can include thickeners, coloring agents, preservatives and other additives in amounts known in the art. Additives for a particular purpose, as well as the appropriate concentrations, are known to those skilled in the art. Coloring agents, such as pigments, dyes or stains are also useful as additives, particularly in flooring applications. Any known coloring agents can be used with this invention. Titanium dioxide is particularly useful to whiten the composition. The coloring agents are used in amounts and added by methods conventionally used for compositions of this type. Other additives will be apparent to those knowledgeable in the art.

Other embodiments of the invention include slurries made by combining sand and water with mixtures of the invention. Such slurries can be used to form high strength flooring or the like. Mixing is typically done at a jobsite. The amount of water added to the dry mixture ranges with application. Reducing the water content results in time and energy savings since there is less water to be removed through drying. Enough water must be provided, however, to ensure suitable flow, mixing and reaction of dry components.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

Final slurry properties such as flow, bleed, settling, and the like are important for usability in the field. Should slurries not have good flow characteristics, for example, high labor costs, uneven final flooring, and/or other undesirable results can occur. Excessive bleed can similarly lead to uneven final floor qualities, lowered final product strength, and the like. Embodiments of the invention have been discovered to provide excellent final slurry properties.

One particular benefit of some example embodiments of the invention has been the discovery that the synergistic interaction of the polysaccharide with the lignin can support significantly higher sand suspensions than were possible in the prior art. Good sand suspension has been achieved using embodiments of the invention at sand ratios of 0.8:1 to 2.3:1 expressed in units of cubic feet of sand per 80 lb sample of dry mixture (these units are an industry standard based on typical commercial packaging including 80 lb of dry mixture and the convenience to end users to specify sand content in cubic feet). It is believed that sand ratios can be extended to 2.5:1 or greater, and even to 3:1 or greater using the present invention.

Different embodiments of the invention include formulations using sand ratios of between about 1.9:1 to 3.5:1, from about 1.9:1 to about 2.3:1, from about 1.9:1 to about 3:1, at least about 2.3:1, from about 2.3:1 to about 3:1, at least about 2.5:1, and at least about 3:1. Some of these ratios, and particularly the higher sand content ones, in combination with favorable physical properties of the resultant product, are previously unknown and represent a surprising and beneficial result. Although the particular reason for this achievement is not known with certainty, it is believed to result at least in part to synergistic interaction between components of the formulation, including the polysaccharides and the lignosulfanates.

It is also noteworthy that the strengths of final flooring structures increased with increasing alpha-hemihydrate use and that the surface hardness was unexpectedly hard. These final product properties were unexpected. Such properties were previously thought to require use of more costly plasticizers, with an example being PCE's. Achievement of these final product qualities, which is again believed to result at least in part from synergies between the polysaccharides (and perhaps the diutan gum in particular) and lignosulfanates, without the requirement of higher cost PCE's represents a valuable and important advantage over the prior art.

In order to further illustrate these example embodiments of the invention example formulations ranges are provided.

TABLE 1

| FORMULATIONS | EXAMPLE 1 | EXAMPLE 2 | EXAMPLE 3 |
|---|---|---|---|
| HYDROCAL ® C-Base | 0-3900 lb (0-97%) | 400-3900 lb (10-75%) | 1000-3900 lb (25-97%) |
| HYDROCAL ® B-Base | 0-3900 lb (0-97%) | 400-3900 lb (10-75%) | 1000-3900 lb (25-97%) |
| Moulding | 0-3900 lb (0-97%) | 0-3000 lb (0-75%) | 0-2900 lb (0-72%) |
| Class "C" Cement | 0-1950 lb (0-50%) | 0-1500 lb (0-40%) | 40-1000 lb (10-25%) |
| Foamaster CN Defoamer | 0.25-20 lb (0.006-0.5%) | 1-10 lb (0.025-0.25%) | 2-8 lb (0.05-0.2%) |
| Marasperse C-21 | 1-100 lb (0.02-2.5%) | 1-50 lb (0.025-1.25%) | 1-25 lb (0.025-0.625%) |
| Suma Retarder | 0-20 lb (0-0.5%) | 0-10 lb (0-0.25%) | 0-5 lb (0-0.125%) |
| CSA Accelerator | 0-20 lb (0-0.5%) | 0 | 0 |
| Polysaccharide | 0.1-40 lb (0.002-1.0%) | 0.5-20 lb (0.01-0.5%) | 1-10 lb (0.02-0.25%) |
| TOTAL BATCH SIZE OF DRY MIX | 4000-5000 lb | 4000-5000 lb | 4000-5000 lb |

In the above Table 1, HYDROCAL® B-BASE is alpha hemihydrate as produced by the lump rock process under controlled pressure and temperature. HYDROCAL®

C-BASE is an alpha hemihydrate produced by the slurry process under controlled pressure and temperature with crystal modifiers added to the process. Both HYDROCAL products are available from United States Gypsum Corp., Chicago, Ill. The moulding is an aridized kettle plaster or beta hemihydrate base made from gypsum under atmospheric conditions. Other types of alpha and beta hemihydrates of gypsum are also considered useful for this invention.

Foamaster CN is a brand defoamer from Geo Specialty Chemical, in LaFayette, Ind. It is a petroleum based defoamer. Other types of defoamers may be used including but not limited to silicate based defoamers such as AGITAN brand defoamers from Applied Chemicals International Group, Basel, Switzerland, HI-MAR defoamers from Hi-Mar Specialty Chemicals, Milwaukee, Wis., Colloid brand defoamers available from Rhone-Poulenc Chemicals, France, and Spa type defoamers in liquid (added at jobsite) or in powder form (provided in the dry mixture). Marasperse C-21 is a type of Ligno-sulfonate plasticizer manufactured by Reed Lignin, Greenwich Conn. Suma retarder is a protein based or amino acid based retarder common in the formulation of gypsum based products. This retarder can be used alone or in conjunction with other types of known retarders such as but not limited to Rochelle salts, ammonium tartrate, sodium citrate, citric acid and sodate retarder.

CSA is climatic stable accelerator which is produced by U.S. Gypsum Company, Chicago Ill. It is a gypsum based accelerator. HRA or heat resistant accelerator and terra alba are two examples of other acceptable gypsum based accelerators. Potassium sulfate, aluminum sulfate, zinc sulfate are also useful accelerators for the purpose of this invention to control the set time, improve surface hardness, help to complete the hydration of the surface and potentially reduce the expansion of the hardened floor.

Class "C" Cement is classified as oil well type cement and has low C3A content and also meets the classification for Type 5 cement. This type of cement can be useful to reduce the risk of producing potentially destructive Ettringite when in the presence of excess moisture and gypsum-based materials. Other types of cements including Type I, II, and III can also be used, as can flyash and other types of flyash cements.

Diutan gum is has been used in the above examples and is believed to provide particular utility in various invention embodiments, but other polysaccharides are also useful. These include, but are not limited to, types of gums such as welan, xanthum gum, and other illustrated above are also useful. The use of combinations of stabilizers can also prove useful. The use of WALOCEL methylhydroxyether cellulose from Wolff Cellulosics, Willowbrook, Ill. or methocellulose ethers can also be employed.

In order to better illustrate some of the benefits and unexpected results achieved through example embodiments shown in Table 1, sand and water were added to these mixes to form slurries of the invention. These slurries were then allowed to set and dry to form solids of the invention, such as subfloor or floor structures. The sand used for the testing was Mohawk fine sand.

At the site where the floor or subfloor is to be laid, water is measured in a desired ratio of the ingredients on a dry solids basis, and placed into a mixing vessel. If any wet or liquid ingredients are used, they are mixed into the water. The dry ingredients are then mixed into the water, forming a homogeneous slurry. The slurry is then applied, pumped, dumped or poured onto a substrate and allowed to set, forming floor or subfloor.

It is often advantageous to vary the composition within the scope of this invention depending upon the mixing or pumping equipment that is used. Different brands of pumping equipment produce shear forces that require certain properties of the slurry to flow properly. Some machines utilize aggregate of a specific particle size distribution. Other machine manufacturers recommend slight changes to the composition. Modifications of the composition to accommodate the equipment is considered to be within the skill of one who normally prepares slurries for such equipment.

Although floor products may not require finishing, finishing the surface is desirable under circumstances as will be known to those skilled in the art. Choice of a finishing technique allows the finisher to control the surface properties to some degree, including the surface wear. The floor is optionally finished by any technique known to cement finishers, including but not limited to floating, pinrolling or screeding.

Table 2 summarizes results for example slurries and floor structures of the invention:

TABLE 2

|  | Example 1 | Example 2 | Example 3 |
| --- | --- | --- | --- |
| Testing Based on 4000 Gram Batches of Sand and Working Formula | | | |
| Water used per 4000 g | 40-270 cc | 135-250 cc | 165-225 cc |
| Slump (inches) | 5-12 inches | 7-11 inches | 8-10 inches |
| Wet Density (lb/ft$^3$) | 120-145 | 125-140 | 130-135 |
| Dry Density Compressive Strength | 100-130 | 105-125 | 110-120 |
| Green strength - 2 hours after set | 300-4000 psi | 500-3000 psi | 600-2500 psi |
| Dry strength - 8 day in dryer | 1000-9000 psi | 1200-6000 psi | 1500-5000 psi |
| Bleed Water: (%) | 0-1% | 0-.5% | 0% |
| Sand suspension notes: | 15-120 min | 30-100 min | 35-60 min |

TABLE 2-continued

|  | Example 1 | Example 2 | Example 3 |
|---|---|---|---|
| Reference: | | | |
| Sand:Working Formula Ratios | 0.5:1 to 3.1:1 cubic feet of sand per 80 lb working formulation | 0.8:1 to 2.7:1 cubic feet of sand to 80 lb working formulation | 1.2:1 to 2.5:1 cubic feet of sand to 80 lb working formulation |
| Sand Density of Mohawk Fine Test Sand (lb/ft3) | 95 | 95 | 95 |
| Surface rating: | 2-7 | 5-7 | 6-7 |

A brief description of test and physical property procedures is provided in order to more fully illustrate the data of Table 2 (such discussion will likewise be useful for similar data provided in other Tables below).

A slump test is useful to characterize how well an aggregate such as sand is suspended in the slurry. The test is intended to simulate conditions where a floor is being poured and the slurry is pumped through hoses. Occasionally the pump has to be stopped to switch to a different batch or to move to a different section of the floor. During these times the slurry sits undisturbed in the hose for several minutes before pumping is resumed. The slump test is intended to simulate these conditions.

All dry components, including aggregate, were weighed and dry blended together. The predetermined amount of deionized water was measured and poured into a mixing bowl. The dry blended material was added to the water and the time noted as the starting point to determine the set time. The mixing bowl was placed onto a Hobart mixer and jogged for approximately five seconds. After one minute of soaking, the material was mixed at low speed for two minutes. The bowl was removed from the mixer and the contents stirred for about 15 seconds with a wisk to assure that all material was evenly mixed.

The initial slump sample was poured into a damp 2"×4" (5 cm×10 cm) cylinder placed on a plastic sheet, slightly overfilling the cylinder. Excess material was screeded from the top, then the cylinder was lifted up smoothly, allowing the slurry to flow out the bottom, making the patty. The patty was measured (±⅛") in two directions 90° apart, and the average reported as the patty diameter. The remaining sample material was permitted to set undisturbed in the pitcher for 5 minutes. Without stirring, additional slump samples were poured at five minute intervals until all the material was gone or until the material set and could not be poured. The mix was not stirred between slump samples.

Bleed water was determined as the excess amount of water on the surface of the samples after the material had set. A 130 mL sample was poured into a 240 mL set cup and allowed to set until Vicat set was achieved. The cup containing the sample and the bleed water was weighed (±0.10 g). Next, the bleed water was poured off and the cup shaken to remove all excess water. The cup and sample were re-weighed. The bleed water was calculated as follows:

(Initial Weight−Final Weight)÷Initial Weight*100=% Bleed Water

Aggregated two-inch cubes were used to test density and compressive strength. Cube molds were prepared by sealing the bottom of the mold with petroleum jelly to prevent leaking and lubricating the molds with an approved release agent, such as WD-40. Sample material was poured into the corner of the cubes until they were approximately ¾ full, stirring to keep the sand suspended if needed. Using a small spatula, the sample material was vigorously agitated from corner to corner for 3-5 seconds, eliminating all bubbles in the cube.

The cubes were then filled to slightly overfull, and the remaining sample material poured into the set cup for additional testing. Excess sample was screeded from the cube molds 10 minutes after Vicat set and the cubes were carefully removed from the molds approximately 50 minutes later. About 24 hours after the cubes were made, they were placed in a 110° F. (43° C.) forced air oven for eight days until constant weight was achieved. Density of the samples was determined by weighing a number of dried cubes and applying the following formula:

Density (lb/ft$^3$)=(Weight of cubes*0.47598)÷number of cubes

Aggregated cubes were used to test for compressive strength using a compressive strength testing machine. Cubes were placed between two platens. Force was applied to the cube as the platens were pushed together. The machine recorded the pounds of force that were required to crush the cube. Total force in pounds was converted to pounds per square inch (psi) by dividing by the surface area of the sample, in this case 4 in$^2$.

Vicat set time is determined from the time the material is added to the water to the time a 300 g. vicat needle penetrates the material ¼" to ½" in a small paper cup sample.

The water used varied due to the moisture which may be present in the sand. Wet sand calls for less water, and vice versa. The range of water for testing above is reported above as a working water usage of 40 g for a 4000 g mix, and is based on extremely wet sand. In this case the sand can be added to the mixer before the plaster where as the sequencing would be significant to the use of the formulation.

An additional set of example formulations were prepared at component concentrations that have been discovered to be particularly useful. These are summarized in Table 3:

| FORMULATIONS AND PHYSICAL TESTS | C-BASE/ MOULDING EXAMPLE | C-BASE EXAMPLE | B-BASE EXAMPLE |
|---|---|---|---|
| HYDROCAL ® C-Base | 2750 lb (68.61%) | 3900 lb (97.15%) | 0 lb |
| HYDROCAL ® B-Base | 0 lb | 0 lb | 3900 lb (97.20%) |
| Moulding | 1150 lb (28.69%) | 0 lb | 0 lb |

-continued

| FORMULATIONS AND PHYSICAL TESTS | C-BASE/ MOULDING EXAMPLE | C-BASE EXAMPLE | B-BASE EXAMPLE |
|---|---|---|---|
| Class "C" Cement | 94 lb (2.35%) | 94 lb (2.34%) | 94 lb (2.34%) |
| Suma Retarder | 0 lb | 0 lb | 0 lb |
| CSA Accelerator | 0.25 lb (<0.01%) | 0.25 lb (<0.01%) | 0.50 lb (0.01%) |
| Diutan gum | 2 lb (0.05%) | 4 lb (0.1%) | 2 lb (0.05%) |
| TOTAL BATCH SIZE OF DRY MIX | 4008 lb | 4014.25 lb | 4012.5 lb |

These formulations were mixed with sand and water and used to form a flooring structure. The slurry and final flooring structure were subjected to testing. This is summarized in the below Table 4:

| Testing Based on 4000 Gram Batches of Sand and Working Formula | C-BASE/ MOULDING EXAMPLE | C-BASE EXAMPLE | B-BASE EXAMPLE |
|---|---|---|---|
| Water used per 4000 g | 205 cc | 180 cc | 175 cc |
| SAND USED | 1262 g | 1067 g | 1262 g |
| Working Formula Wt. g | 2738 g | 2933 g | 2738 g |
| Vicat Set (minutes) | 57 | 177 | 240 |
| Slump (inches) | 8.88 | 8.88 | 9.13 |
| Wet Density (#/ft3) | 130 | 132 | 135 |
| Dry Density (#/ft3) | 115 | 120 | 125 |
| Compressive Strength | | | |
| Green strength - 2 hours after set | 1267 | 908 | 1917 |
| Dry strength - 8 day in dryer | 2875 | 2433 | 4392 |
| Bleed Water: (%) | 0 | 0 | 0 |
| Sand suspension notes: | Great | Great | Great |
| Sand:Working Formula Ratios | 1.9:1 | 2.3:1 | 1.9:1 |
| Notes: | Great Surface Hardness | Great Surface Hardness | Great Surface Hardness |
| Surface rating: | 6 | 7 | 7 |

The above physical property and test data represents surprising and unexpected results. Among other items, the sand suspension of the slurries of the invention and the strength and surface quality of the resulting solid flooring structures of the invention made using the example formulations of the invention that included a high concentration of beta hemihydrate ("Moulding example" with ratio of about 17:7 alpha to beta hemihydrate) represent surprising results. Other surprising results include the high strength of the solid product made using the example formulation of the invention that includes 100% lump rock alpha hemi-hydrate. This material's strength as compared to the strength of the solid resulting from the 100% slurry alpha hemihydrate is surprising. Other embodiments of the invention are believed to achieve similar results with at least about 90% by weight of the gypsum comprising lump-rock hemihydrate. Still other surprising results include the high sand suspension ratios reached.

These unexpected results are believed to result, at least in large part, from the synergistic interaction between the polysaccharide and the lignosulfonate in mixtures of the invention. These unexpected results also confirm that embodiments of the present invention can be used to attain advantageous physical properties without the cost associated with superplasticizers such as PCE's.

The embodiments and examples shown herein are intended to exemplify the invention and are not intended to limit it in any way. Optional ingredients of the composition can be combined in any useful manner with any embodiment of this invention. Additional embodiments and uses for this invention will be apparent to an artisan in this particular field.

The invention claimed is:

1. A mixture to be employed in conjunction with water for preparing a slurry that hydrates to form a high strength flooring compound, comprising:
   about 50% to about 98% by weight calcium sulfate hemihydrate;
   about 0.002% to about 1% by weight polysaccharide, wherein said polysaccharide is a biopolymeric gum; and
   about 0.02% to about 2.5% by weight of a lignosulfanate.

2. The mixture of claim 1 wherein said polysaccharide comprises a xanthan gum.

3. The mixture of claim 1 wherein said polysaccharide comprises a heteropolysaccharide present in a weight range of between about 0.01% to about 0.5%.

4. The mixture of claim 1 wherein said polysaccharide is present in a weight range of between about 0.02% to about 0.25%.

5. The mixture of claim 1 wherein said polysaccharide comprises diutan gum.

6. The mixture of claim 1 wherein said polysaccharide is a nonionic homopolysacchrion with an average molecular weight greater than or equal to $5 \times 10^6$.

7. The mixture of claim 1 wherein said lignosulfanate is present in a weight ratio of between about 0.025% to about 1.25%.

8. The mixture of claim 1 wherein said lignosulfanate is present in a weight range of between about 0.025% to about 0.625%.

9. The mixture of claim 1 and further comprising water and sand in combination with said mixture wherein a slurry is formed, and wherein said sand is present in a ratio of between about 1.9:1 and 3.5:1 to said mixture (in units of $ft^3$ sand: 80 lb of dry mixture).

10. The mixture of claim 1 and further comprising water and sand in combination with said mixture wherein a slurry is formed, and wherein said sand is present in a weight ratio of between about 2.3:1 and about 3:1 to said mixture (in units of $ft^3$ sand: 80 lb of dry mixture).

11. The mixture of claim 1 and further comprising water and sand in combination with said mixture wherein a slurry is formed, and wherein said sand is present in a weight ratio of at least about 2.5:1 (in units of $ft^3$ sand: 80 lb of dry mixture).

12. The mixture of claim 1 and further comprising water and sand in combination with said mixture wherein a slurry is formed, and wherein said sand is present in a weight ratio of up to about 3:1 (in units of $ft^3$ sand: 80 lb of dry mixture) while retaining good sand suspension.

13. The mixture of claim 1 wherein said calcium sulfate hemihydrate is comprised of at least about 90% lump rock alpha-hemihydrate.

14. The mixture of claim 1 wherein said calcium sulfate hemihydrate is 100% lump rock alpha-hemihydrate.

15. A slurry that hydrates to form a high strength flooring compound, comprising:
   a first mixture comprising:
   about 50% to about 98% by weight calcium sulfate hemihydrate,
   about 0.002% to about 1% by weight polysaccharide;

wherein said polysaccharide is a biopolymeric gum;
about 0.02% to about 2.5% by weight of a lignin; and
water and sand mixed with said first mixture to form the slurry, wherein said sand is present in a weight ratio of at least about 2.5:1 (in units of ft$^3$ sand: 80 lb of dry mixture).

16. A slurry as defined by claim 15 wherein said polysaccharide is present in a weight range of between about 0.02% to about 0.25% in said first mixture, and wherein said polysaccharide comprises diutan gum.

17. A slurry as defined by claim 15 wherein said calcium sulfate hemihydrate is comprised of at least about 90% lump rock alpha-hemihydrate.

18. A slurry as defined by claim 16 wherein said lignin is a lignosulfanate.

19. A slurry as defined by claim 16 wherein said sand is present in a weight ratio of up to about 3:1 (in units of ft$^3$ sand: 80 lb of dry mixture).

20. The mixture of claim 1 wherein said calcium sulfate hemihydrate comprises beta-calcined calcium sulfate hemihydrate.

* * * * *